(12) United States Patent
Alber

(10) Patent No.: US 9,988,148 B2
(45) Date of Patent: Jun. 5, 2018

(54) VEHICLE WITH ASYMMETRIC NACELLE CONFIGURATION

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 270 days.

(21) Appl. No.: 14/795,505

(22) Filed: Jul. 9, 2015

(65) Prior Publication Data

US 2016/0023753 A1  Jan. 28, 2016

Related U.S. Application Data

(60) Provisional application No. 62/027,522, filed on Jul. 22, 2014.

(51) Int. Cl.
| | | |
|---|---|---|
| *B64C 29/02* | (2006.01) | |
| *B64D 27/02* | (2006.01) | |
| *B64C 39/02* | (2006.01) | |

(52) U.S. Cl.
CPC ............ *B64C 29/02* (2013.01); *B64C 39/024* (2013.01); *B64D 27/02* (2013.01); *B64C 2201/021* (2013.01); *B64C 2201/088* (2013.01)

(58) Field of Classification Search
CPC ........ B64D 27/02; B64D 27/06; B64D 27/12; B64D 27/18; B64C 29/02
See application file for complete search history.

(56) References Cited

U.S. PATENT DOCUMENTS

| | | | | |
|---|---|---|---|---|
| 1,871,015 A | * | 8/1932 | Squires ................. | B64D 27/06 244/53 R |
| 2,406,506 A | | 8/1946 | Northrop | |
| 2,412,646 A | | 12/1946 | Northrop | |
| 3,761,041 A | | 9/1973 | Putman | |
| 4,260,121 A | * | 4/1981 | Baston .................... | B64C 13/16 192/223 |
| 5,082,204 A | | 1/1992 | Croston | |
| 5,149,016 A | * | 9/1992 | Huhn ..................... | B64D 27/02 244/12.3 |
| 5,524,847 A | | 6/1996 | Brodell | |
| 6,129,308 A | | 10/2000 | Nastasi | |
| 6,913,228 B2 | | 7/2005 | Lee | |
| 7,108,230 B2 | | 9/2006 | Clark | |
| 8,191,820 B1 | | 6/2012 | Westra | |
| 8,408,490 B2 | | 4/2013 | McDonnell | |
| 9,567,088 B2 | * | 2/2017 | Godlasky ............... | B64D 27/02 |
| 2010/0123047 A1 | | 5/2010 | Williams | |
| 2012/0286102 A1 | * | 11/2012 | Sinha ..................... | B64C 29/02 244/7 B |
| 2014/0008486 A1 | | 1/2014 | Alber | |
| 2014/0154084 A1 | | 6/2014 | Alber | |

FOREIGN PATENT DOCUMENTS

| | | | | |
|---|---|---|---|---|
| EP | 2738092 | | 6/2014 | |
| FR | 2903380 A1 | * | 1/2008 | ............. B64C 29/02 |
| FR | 3036377 A1 | * | 11/2016 | ............. B64C 17/02 |

* cited by examiner

*Primary Examiner* — Richard R Green
(74) *Attorney, Agent, or Firm* — Cantor Colburn LLP

(57) ABSTRACT

A vehicle is provided and includes a wing having opposite surfaces and opposite sides and first and second engines disposed to drive wing movement and being respectively supported asymmetrically on the opposite surfaces and at the opposite sides of the wing.

15 Claims, 2 Drawing Sheets

VEHICLE WITH ASYMMETRIC NACELLE CONFIGURATION

CROSS REFERENCE TO RELATED APPLICATION

This application is a Non-Provisional of U.S. Provisional Application No. 62/027,522 filed Jul. 22, 2014 the disclosures of which are incorporated by reference herein in its entirety.

BACKGROUND OF THE INVENTION

The subject matter disclosed herein relates to a vehicle with an asymmetric nacelle configuration and, more particularly, to a duel prop-rotor multi-altitude vertical take-off and landing (VTOL) aircraft with an asymmetric nacelle configuration.

A vertical take-off and landing aircraft (VTOL) is an aircraft that can take off, land and hover in a vertical direction and that can conduct flight operations in a horizontal orientation. A VTOL aircraft may be manned (i.e., piloted) or unmanned in the case of remotely piloted or autonomous aircraft and may be housed or stowed in places with limited deck and storage areas, such as naval ships.

In some cases, a VTOL aircraft may have a tail sitter configuration. Because of its wide range of multi-attitude capability, such an aircraft needs to have center of gravity (CG) control capability about three axes. However, in a typical "turbo-prop" nacelle configuration, the nacelles, engines and the propeller-rotors hang below the wing such that hover CG limits can be exceeded and CG control capability can be deteriorated.

BRIEF DESCRIPTION OF THE INVENTION

According to one aspect of the invention, a vehicle is provided and includes a wing having opposite surfaces and opposite sides and first and second engines disposed to drive wing movement and being respectively supported asymmetrically on the opposite surfaces and at the opposite sides of the wing.

In accordance with additional or alternative embodiments, the vehicle includes a vertical take-off and landing (VTOL) aircraft with hover capability.

In accordance with additional or alternative embodiments, the wing includes opposite leading and trailing edges and opposite side edges extending between the opposite leading and trailing edges.

In accordance with additional or alternative embodiments, at least one of the leading and trailing edges edge is substantially planar and at least one of the leading and trailing edges is tapered.

In accordance with additional or alternative embodiments, trailing edge tapering includes a point at a mid-line of the wing between the opposite sides.

In accordance with additional or alternative embodiments, the wing has a side-to-side wing axis extending between the opposite surfaces and the first and second engines define a lift axis transversely oriented relative to the wing axis.

In accordance with additional or alternative embodiments, the vehicle includes an additional engine supported at a crossing of the wing and lift axes.

In accordance with additional or alternative embodiments, the vehicle includes additional engines supported asymmetrically on the opposite surfaces and at the opposite sides of the wing.

In accordance with additional or alternative embodiments, the engines each include a propeller-rotor.

In accordance with additional or alternative embodiments, the vehicle includes a first engine nacelle configured to support the first engine and coupled to one of the opposite surfaces at one of the opposite sides of the wing and a second engine nacelle configured to support the second engine and coupled to the other one of the opposite surfaces at the other one of the opposite sides of the wing.

In accordance with additional or alternative embodiments, the vehicle includes first and second secondary wings extending from each of the opposite surfaces at one of the opposite sides of the wing and third and fourth secondary wings extending from each of the opposite surfaces at the other of the opposite sides of the wing.

In accordance with additional or alternative embodiments, the vehicle includes alighting elements disposed at trailing ends of the first, second, third and fourth secondary wings to support the wing during grounded conditions.

According to yet another aspect of the invention, a vertical take-off and landing (VTOL) aircraft with hover capability is provided and includes a wing having opposite surfaces, opposite sides and a side-to-side wing axis extending between the opposite surfaces and first and second nacelle supported, propeller-rotor engines disposed to drive wing movement. The first and second nacelle supported, propeller-rotor engines are respectively supported asymmetrically on the opposite surfaces and at the opposite sides of the wing to define a lift axis transversely oriented relative to the wing axis to thereby facilitate center of gravity control during hover operations.

In accordance with additional or alternative embodiments, the VTOL aircraft with hover capability further includes one or more of an additional engine supported at a crossing of the wing and lift axes and additional engines supported asymmetrically on the opposite surfaces and at the opposite sides of the wing.

In accordance with additional or alternative embodiments, The VTOL aircraft with hover capability further includes first and second secondary wings extending from each of the opposite surfaces at one of the opposite sides of the wing, third and fourth secondary wings extending from each of the opposite surfaces at the other of the opposite sides of the wing and alighting elements disposed at trailing ends of the first, second, third and fourth secondary wings to support the wing during grounded conditions.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a vehicle is provided and may be a vertical take-off and landing (VTOL) aircraft with a tail sitter configuration that can fly as a rotorcraft and as a fixed wing aircraft. Because of its wide range of multi-attitude capability, the vehicle needs to have center of gravity (CG) control capability about three axes. While this can be problematic in a typical "turbo-prop" nacelle configuration in which the nacelles, engines and the propeller-rotors (hereinafter referred to as "prop-rotors") hang below the wing so that hover CG limits can be exceeded, the following relates to a configuration where one nacelle hangs below the wing and another is supported above the wing. This asymmetric configuration offers better CG control for the vehicle while in hover mode.

Figure 1:
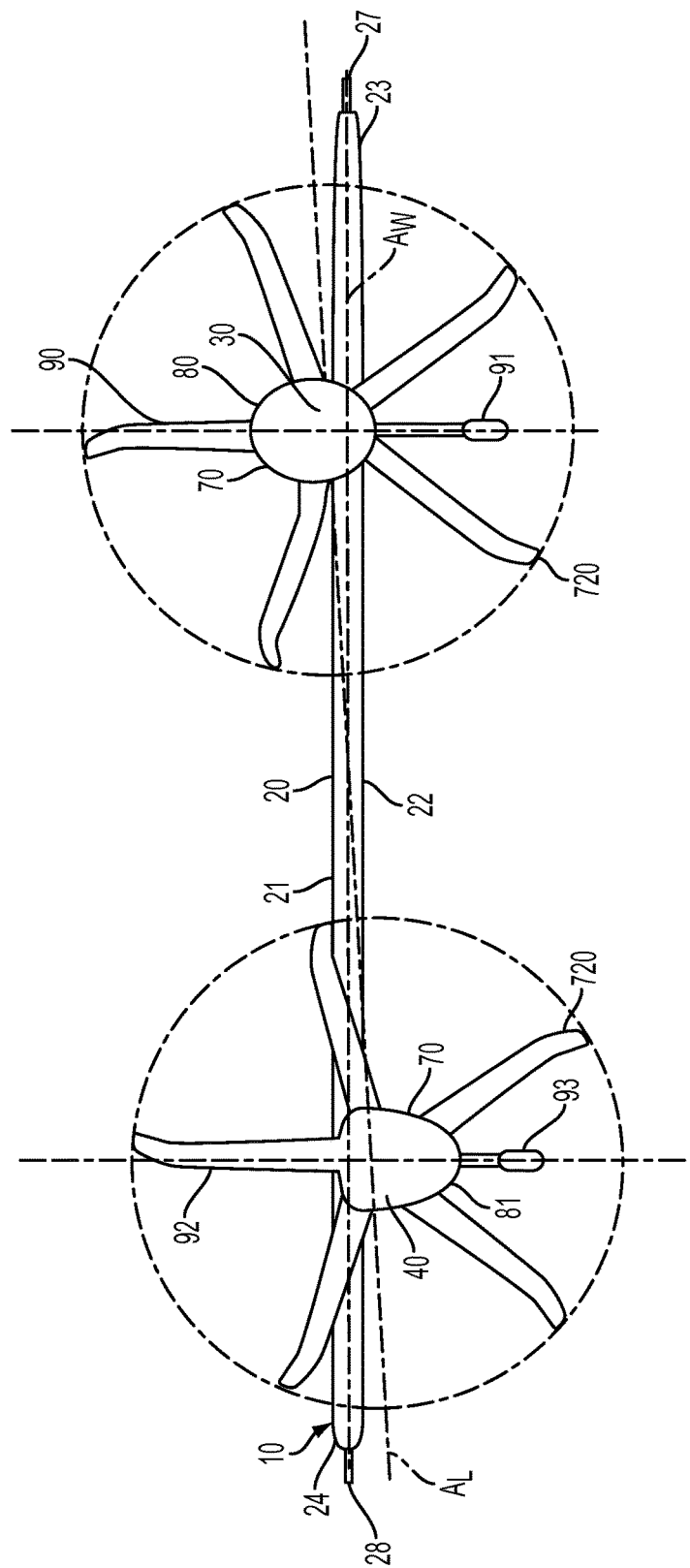
FIG. 1 is a front view of a vehicle in accordance with embodiments.
Figure 2:
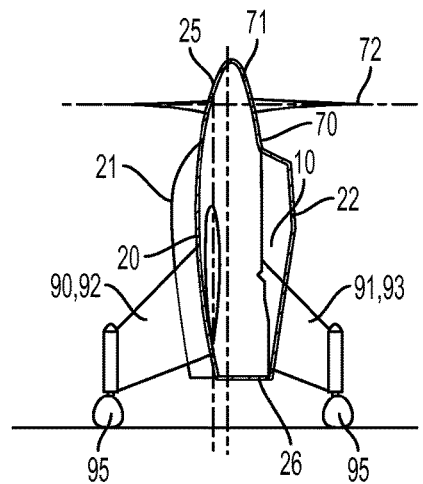
FIG. 2 is a plan view of the vehicle of FIG. 1.
Figure 3:
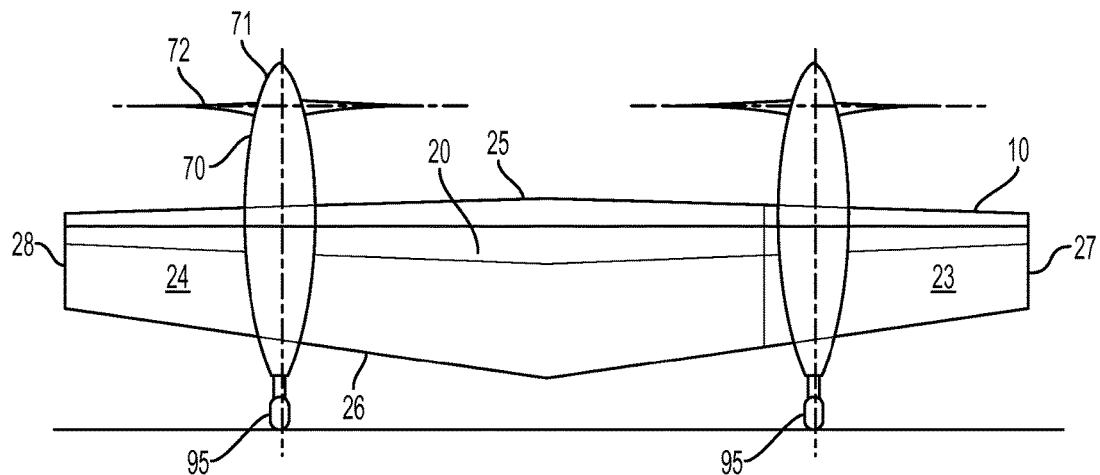
FIG. 3 is a side view of the vehicle of FIG. 1.

With reference to FIGS. 1-3, a vehicle 10 is provided and may be a manned or unmanned VTOL aircraft with a tail sitter configuration and hover capability. The vehicle 10 includes a wing 20 and at least a first engine 30 and a second engine 40. The wing 20 has a first (or suction or upper) surface 21 and a second (or pressure or lower) surface 22 opposite the upper surface 21 as well as a first side 23 and a second side 24. The first and second sides 23 and 24 oppose one another and may be substantially similarly shaped and weighted. The wing 20 further includes a substantially planar leading edge 25 and a tapered trailing edge 26, which are respectively defined in accordance with normal flight patterns, as well as first and second side edges 27 and 28 respectively associated with distal portions of the first and second sides 23 and 24. The tapered trailing edge 26 may include an aerodynamic pointed portion 260, which may be substantially aligned with a mid-line of the vehicle 10 between the first and second sides 23 and 24.

Although the leading edge 25 and the trailing edge 26 are illustrated as being planar and tapered, respectively, it will be understood that this configuration is not required and that alternative configurations are possible. For example, the leading edge 25 could be tapered and the trailing edge 26 could be planar, both the leading and trailing edges 25 and 26 could be planar or both the leading and trailing edges 25 and 26 could be tapered.

The wing 20 thus defines a volumetric aerodynamic element and has a side-to-side wing axis $A_W$ extending between the first and second side edges 27 and 28. The first and second engines 30 and 40 are disposed to drive wing movement and are respectively supported asymmetrically on the wing 20. That is, the first engine 30 may be supported on the first surface 21 at the first side 23 of the wing 20 and the second engine 40 may be supported on the second surface 22 at the second side 24 of the wing 20. As such, the first and second engines 30 and 40 define a lift axis $A_L$ that is transversely oriented relative to the wing axis $A_W$ to thereby facilitate center of gravity control of the vehicle 10 during hover operations in which the vehicle 10 is in flight but remains in a substantially vertical orientation (i.e., the leading edge 25 faces upwardly and the trailing edge 26 faces the ground).

Figure 4:
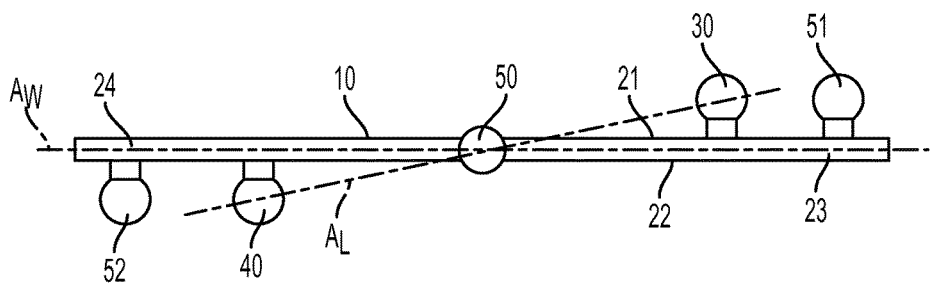
FIG. 4 is a front view of a vehicle in accordance with additional alternative embodiments.

In accordance with further embodiments and, with reference to FIG. 4, the vehicle 10 may include at least one or more of an additional engine 50, which may be supported at a crossing of the wing axis $A_W$ and the lift axis $A_L$, and additional engines 51, 52 supported asymmetrically on the first surface 21 at the first side 23 of the wing 20 and on the second surface 22 at the second side 24 of the wing 20, respectively. The lift axis AL show shift to a thrust center of each engine pair (i.e., mid-way between second engine 40 and additional engine 52 and first engine 30 and additional engine 51.

In any case, the first and second engines 30 and 40 of FIGS. 1-3 (as well as the additional engines 50, 51 and 52 of FIG. 4) may each includes a prop-rotor 70. The prop-rotor 70 includes a hub 71 and a plurality of blades 72 extending radially outwardly from the hub 71. Each blade 72 may further include a bladelet 720 at a distal end thereof, which is angled obtusely relative to the associated blade 72. The bladelets 720 of the first side 23 of the wing 20 may be oppositely angled relative to the bladelets 720 of the second side 24 of the wing 20. In operation, the first and second engines 30 and 40 drive rotations of the prop-rotors 70 to thereby induce thrust generation to drive a movement of the wing 20 and the vehicle 10 in general.

In accordance with further embodiments, the first engine 30 may be supported within a first engine nacelle 80, which is coupled to the first surface 21 at the first side 23 of the wing 20 and the second engine 40 may be supported within the a second engine nacelle 81, which is coupled to the second surface 22 at the second side of the wing 20. Thus, the first, nacelle supported engine 30 may be disposed above the wing 20 at the first side 23 of the wing 20 and the second, nacelle supported engine 40 may be supported below the wing 20 at the second side 24 of the wing 20.

The vehicle 10 may further include first and second secondary wings 90 and 91 as well as third and fourth secondary wings 92 and 93 to provide for additional flight control for the vehicle 10. The first secondary wing 90 extends transversely or normally away from the first surface 21 at the first side 23 of the wing 20, the second secondary wing 91 extends transversely or normally away from the second surface 22 at the first side 23 of the wing 20, the third secondary wing 92 extends transversely or normally away from the first surface 21 at the second side 24 of the wing 20 and the fourth secondary wing 93 extends transversely or normally away from the second surface 22 at the second side 24 of the wing 20. In addition, the vehicle 10 may include alighting elements 95, which are respectively disposed at trailing ends of the first, second, third and fourth secondary wings 90, 91, 92 and 93 to support the wing 20 during grounded conditions of the vehicle 10.

Although the vehicle 10 is described above as having a tail sitter configuration, it is to be understood that this is not required and that other configurations are possible. For example, at least one or both of the first and second engines 30 and 40 may be a pusher propeller.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle, comprising:
   a wing having opposite surfaces and opposite sides; and
   first and second engines disposed to drive wing movement and being respectively supported asymmetrically on the opposite surfaces and substantially equidistant from a mid-line at the opposite sides of the wing wherein a surface opposite of the first engine is devoid of an engine and a surface opposite the second engine is devoid of an engine.

2. The vehicle according to claim 1, wherein the vehicle comprises a vertical take-off and landing (VTOL) aircraft with hover capability.

3. The vehicle according to claim 1, wherein the wing comprises:
   opposite leading and trailing edges; and
   opposite side edges extending between the opposite leading and trailing edges.

4. The vehicle according to claim 3, wherein at least one of the leading and trailing edges is substantially planar and at least one of the leading and trailing edges is tapered.

5. The vehicle according to claim 3, wherein trailing edge tapering comprises a point at a mid-line of the wing between the opposite sides.

6. The vehicle according to claim 3, wherein the wing has a side-to-side wing axis extending between the opposite surfaces and the first and second engines define a lift axis transversely oriented relative to the wing axis.

7. The vehicle according to claim 6, further comprising an additional engine supported at a crossing of the wing and lift axes.

8. The vehicle according to claim 6, further comprising additional engines supported asymmetrically on the opposite surfaces and at the opposite sides of the wing.

9. The vehicle according to claim 1, wherein the first and second engines each comprise a propeller-rotor.

10. The vehicle according to claim 1, further comprising:
    a first engine nacelle configured to support the first engine and coupled to one of the opposite surfaces at one of the opposite sides of the wing; and
    a second engine nacelle configured to support the second engine and coupled to the other one of the opposite surfaces at the other one of the opposite sides of the wing.

11. The vehicle according to claim 1, further comprising:
    first and second secondary wings extending from each of the opposite surfaces at one of the opposite sides of the wing; and
    third and fourth secondary wings extending from each of the opposite surfaces at the other of the opposite sides of the wing.

12. The vehicle according to claim 11, further comprising alighting elements disposed at trailing ends of the first, second, third and fourth secondary wings to support the wing during grounded conditions.

13. A vertical take-off and landing (VTOL) aircraft with hover capability, comprising:
    a wing having opposite surfaces, opposite sides and a side-to-side wing axis extending between the opposite surfaces; and
    first and second nacelle supported, propeller-rotor engines disposed to drive wing movement,
    the first and second nacelle supported, propeller-rotor engines being respectively supported asymmetrically on the opposite surfaces and substantially equidistant from a mid-line at the opposite sides of the wing to define a lift axis transversely oriented relative to the wing axis to thereby facilitate center of gravity control during hover operations, wherein a surface opposite of the first engine is devoid of an engine and a surface opposite the second engine is devoid of an engine.

14. The VTOL aircraft with hover capability according to claim 13, further comprising one or more of:
    an additional engine supported at a crossing of the wing and lift axes; and
    additional engines supported asymmetrically on the opposite surfaces and at the opposite sides of the wing.

15. The VTOL aircraft with hover capability according to claim 13, further comprising:
    first and second secondary wings extending from each of the opposite surfaces at one of the opposite sides of the wing;
    third and fourth secondary wings extending from each of the opposite surfaces at the other of the opposite sides of the wing; and
    alighting elements disposed at trailing ends of the first, second, third and fourth secondary wings to support the wing during grounded conditions.

\* \* \* \* \*